(12) United States Patent  
Na

(10) Patent No.: US 8,709,251 B2  
(45) Date of Patent: Apr. 29, 2014

(54) COOLANT DEMINERALIZER FOR FUEL CELL VEHICLE

(75) Inventor: Sung Wook Na, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 235 days.

(21) Appl. No.: 12/833,301

(22) Filed: Jul. 9, 2010

(65) Prior Publication Data

US 2011/0256470 A1 Oct. 20, 2011

(30) Foreign Application Priority Data

Apr. 15, 2010 (KR) .................. 10-2010-0034530

(51) Int. Cl.  
*B01D 24/16* (2006.01)

(52) U.S. Cl.  
USPC .......................................... 210/282; 210/289

(58) Field of Classification Search  
USPC .......................................... 210/282, 287–289  
See application file for complete search history.

(56) References Cited

U.S. PATENT DOCUMENTS

| 5,626,763 | A | 5/1997 | Mathews |
| 7,261,816 | B2 * | 8/2007 | Suzuki et al. ................. 210/282 |
| 2006/0175262 | A1 * | 8/2006 | Martin ........................... 210/670 |

FOREIGN PATENT DOCUMENTS

| JP | 2009-195792 A | 9/2009 |
| KR | 10-0511213 | 2/2002 |
| KR | 10-2006-0038369 | 5/2006 |

* cited by examiner

*Primary Examiner* — Matthew O Savage  
(74) *Attorney, Agent, or Firm* — Edwards Wildman Palmer LLP; Peter F. Corless

(57) ABSTRACT

The present invention provides a coolant demineralizer for a fuel cell vehicle, which removes ions released from coolant of a fuel cell stack. In preferred embodiments, the present invention provides a coolant demineralizer configured to reduce the occurrence of differential pressure due to an ion resin layer such that coolant can smoothly flow through a filter member, thereby increasing the effect of filtering ions and improving the efficiency of use of ion resin.

7 Claims, 9 Drawing Sheets

PRIOR ART

PRIOR ART

COOLANT DEMINERALIZER FOR FUEL CELL VEHICLE

CROSS-REFERENCE TO RELATED APPLICATION

This application claims under 35 U.S.C. §119(a) the benefit of Korean Patent Application Nos. 10-2010-0034530 filed Apr. 15, 2010, the entire contents of which are incorporated herein by reference.

BACKGROUND (a) Technical Field

The present disclosure relates, generally, to a coolant demineralizer for a fuel cell vehicle. More particularly, it relates to a coolant demineralizer for a fuel cell vehicle, which removes released ions from coolant of a fuel cell stack.

(b) Background Art

A fuel cell system employed in a hydrogen fuel cell vehicle as an environmental-friendly vehicle comprises a fuel cell stack for suitably generating electricity by an electrochemical reaction of reactant gases, a hydrogen supply system for suitably supplying hydrogen as a fuel to the fuel cell stack, an air supply system for suitably supplying oxygen-containing air as an oxidant required for the electrochemical reaction in the fuel cell stack, a thermal management system for suitably removing reaction heat from the fuel cell stack to the outside of the fuel cell system, controlling operation temperature of the fuel cell stack, and suitably performing water management function, and a system controller for suitably controlling the overall operation of the fuel cell system.

In the above configuration, the fuel cell stack generates electrical energy by the electrochemical reaction of hydrogen and oxygen as reactant gases and suitably discharges heat and water as by-products of the reaction. Accordingly, a system for cooling the fuel cell system to prevent the temperature rise of the fuel cell stack is necessarily required in the fuel cell system.

Accordingly, there remains a need in the art for coolant demineralizer for a fuel cell vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a demineralizer for a fuel cell vehicle that is suitably configured to prevent the occurrence of differential pressure due to an ion resin layer such that coolant smoothly flows through the demineralizer, thereby increasing the effect of filtering ions. The present invention, in preferred embodiments, solves the problems of the generation of electrical conductivity, the current leakage from a fuel cell stack, and the electrical safety.

In one aspect, the present invention provides a coolant demineralizer for a fuel cell vehicle, the coolant demineralizer preferably including a housing including an inlet port and an outlet port; and a filter member, in which an ion resin is filled, including an inlet formed at one end of the filter member and suitably connected to the inlet port such that coolant is introduced therethrough and an outlet formed at a side of the filter member such that the coolant passing through the ion resin is discharged from the side in a radial direction, wherein the coolant demineralizer further comprises a flow chamber suitably connected to the outlet port of the housing and formed around the periphery of the filter member in the housing such that the coolant is discharged from the filter member through the outlet in a radial direction and then discharged from the flow chamber to the outlet port.

In a preferred embodiment, the filter member may be inserted into the housing in the longitudinal direction and along the same axis as the housing and the flow chamber may be formed by a space between the outer surface of the filter member, on which the outlet is formed, and the inner surface of the housing.

In another preferred embodiment, the filter member may include a cylindrical filter frame including the inlet formed at one end and the outlet formed on the outer circumferential surface corresponding to the side of the filter member; a mesh net provided at the inlet the filter frame; a mesh net provided at the outlet of the filter frame; and the ion resin filled in the inner space of the filter frame.

In still another preferred embodiment, the outlet may be suitably formed on the side of the filter member in the longitudinal direction and a plurality of outlets may be arranged side by side at regular intervals.

In yet another preferred embodiment, each outlet may be provided in a predetermined area of the rear of the filter member in the longitudinal direction with respect to the direction into which the coolant is suitably introduced.

In still another preferred embodiment, the coolant demineralizer may further include a filter cap detachably assembled with the other end of the filter frame to seal the inner space of the filter frame.

In yet another preferred embodiment, the housing may include a housing main body including the inlet port and accommodating the filter member and a housing cap including the outlet port and sealing the housing main body, wherein the housing cap is detachably assembled with the housing main body.

In still yet another preferred embodiment, the housing cap may include a plurality of projections formed on an inner surface of the housing cap and suitably supporting the filter member such that a coolant path for connecting the flow chamber and the outlet port is formed between the projections.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
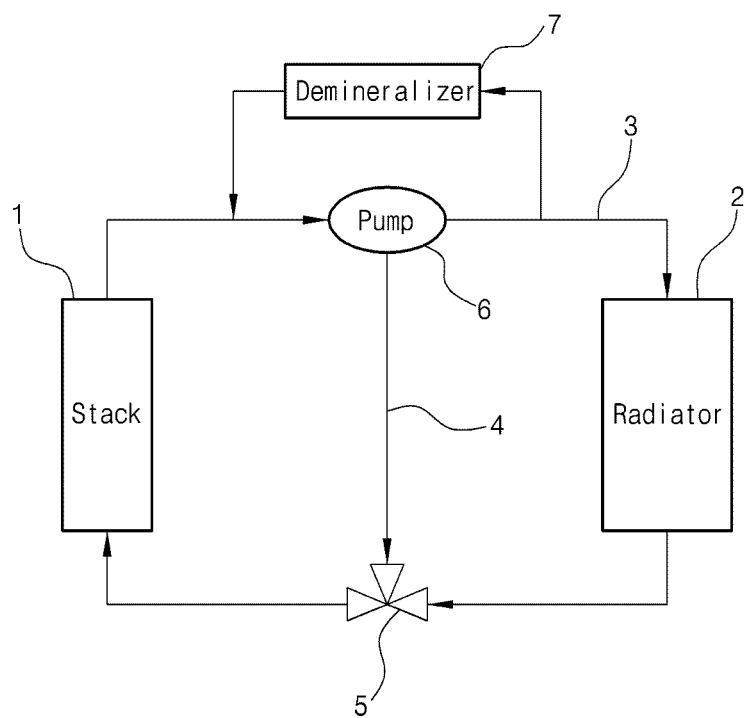
FIG. 1 is a schematic diagram of a coolant loop of the fuel cell vehicle.

Reference numerals set forth in the Drawings includes reference to the following elements as further discussed below:

| | |
|---|---|
| 100: demineralizer | 102: flow chamber |
| 110: housing | 111: housing main body |
| 112: housing cap | 115: projection |
| 120: inlet port | 130: outlet port |
| 140: filter member | 141: filter frame |
| 142: inlet | 143: outlet |
| 144b: mesh net | 145: mesh net |
| 146: filter cap | 147: ion resin |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features a coolant demineralizer for a fuel cell vehicle, the coolant demineralizer comprising a housing comprising an inlet port and an outlet port, a filter member comprising an inlet and an outlet, wherein the filter member is filled with an ion resin, and a flow chamber.

In one embodiment, the inlet is formed at one end of the filter member and connected to the inlet port such that coolant is introduced therethrough and wherein the outlet is formed at a side of the filter member such that the coolant passing through the ion resin is discharged from the side in a radial direction.

In another embodiment, the flow chamber is connected to the outlet port of the housing and is formed around the periphery of the filter member in the housing such that the coolant is discharged from the filter member through the outlet in a radial direction and then discharged from the flow chamber to the outlet port.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In a typical fuel cell system for a vehicle, a water cooling system for circulating water through a coolant channel in the fuel cell stack is used to cool the fuel cell stack, thus suitably maintaining the fuel cell stack at an optimal temperature.

An exemplary configuration of the cooling system of the fuel cell vehicle is shown in FIG. 1. FIG. 1 is a schematic diagram of a coolant loop of the fuel cell vehicle, which comprises a coolant line 3 that is suitably disposed between a fuel cell stack 1 and a radiator 2 to circulate coolant, a bypass line 4 and a three-way valve 5 for bypassing the coolant so as not to pass through the radiator 2, and a pump 6 for pumping the coolant.

The applicable materials for pipes, which constitute the coolant loop of the fuel cell system, are very limited due to ion release and include SUS316L, Teflon, AI 3003, Food-Grade silicon, and the like which have a suitably low release rate. Further, it is not possible to use SUS304 due to ion release.

When cheap materials are used, impurities and ions are released from the material which is in contact with the coolant, and the released ions may cause the electricity generated from the fuel cell stack to flow through the coolant.

Moreover, when the ion conductivity (the electrical conductivity) of the coolant is increased by the material used in the fuel cell vehicle, which moves while generating electricity and carrying a driver and passengers, electricity may flow through the coolant loop, which makes it very difficult for the electrical devices and driving components, mounted in the vehicle, to normally operate and further causes considerable danger (the risk of an electric shock) to the driver and passengers.

To solve this problem, the electrical conductivity of the coolant in the fuel cell vehicle is measured at all times, and a control logic for shutting down the fuel cell system when the electrical conductivity is suitably increased to a predetermined level is employed.

Further, a demineralizer 7 is suitably provided in the coolant loop to maintain the ion conductivity and the electrical conductivity of the coolant below a predetermined level.

Figure 2:
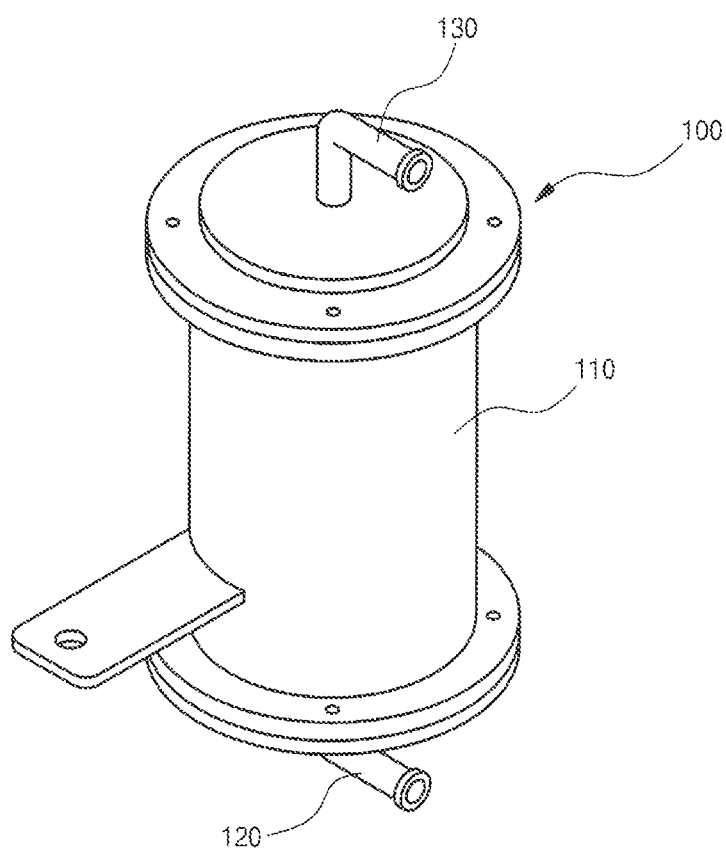
FIG. 2 is a perspective view of a conventional coolant demineralizer.
Figure 3:
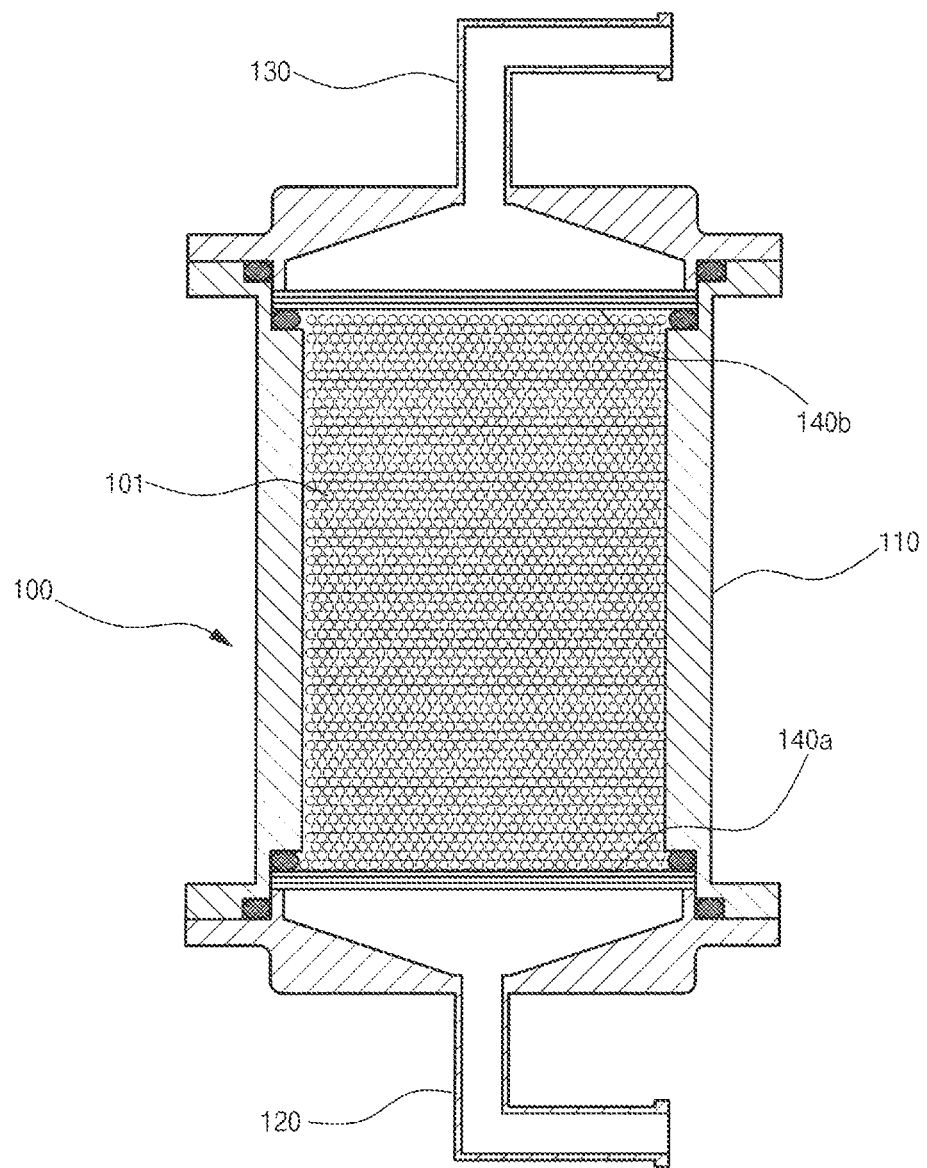
FIG. 3 is a longitudinal cross-sectional view of the conventional coolant demineralizer.
Figure 4:
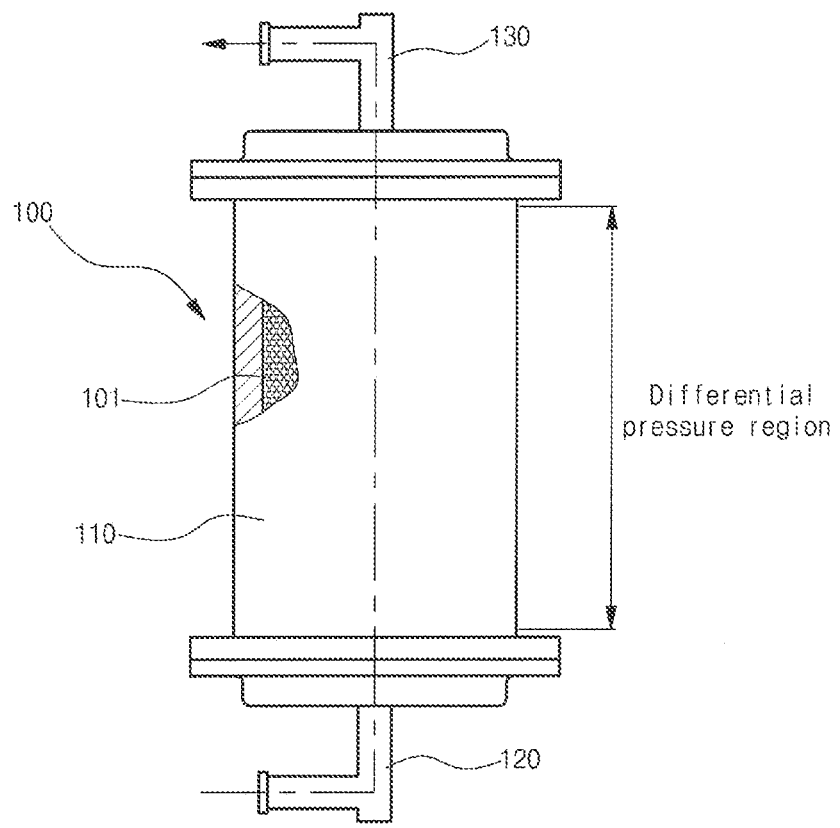
FIG. 4 is a diagram showing a differential pressure region in the conventional coolant demineralizer.

Preferably, the demineralizer 7 serves to suitably reduce the ion conductivity (the electrical conductivity) below a predetermined level by filtering ions contained in the coolant flowing through the fuel cell stack 1. FIG. 2 is an exemplary perspective view of a conventional demineralizer, FIG. 3 is an exemplary longitudinal cross-sectional view of FIG. 2, and FIG. 4 is an exemplary diagram showing a differential pressure region (in which an ion resin is filled) in the conventional demineralizer.

Preferably, the demineralizer 100 typically comprises a housing 110 through which coolant is passed, an inlet port 120 and an outlet port 130 through which the coolant is suitably introduced and discharged, an ion resin 101 filled in the housing 110 to filter ions contained in the coolant, and mesh assemblies 140a and 140b for supporting the ion resin 101 filled in the housing 110 and preventing the ion resin 101 from leaking.

In the above configuration, the mesh assemblies 140a and 140b serve to pass the coolant and entrap the ion resin 101 in the form of small grains in the housing 110. The mesh assemblies 140a and 140b are provided at both the inlet port 120 and the outlet port 130 at both ends of the housing 110 to prevent the ion resin 101 filled in the housing 110 from leaking.

In the demineralizer 100 having the above-described configuration, the coolant suitably introduced through the inlet port 120 on the bottom of the housing 110 (connected to an output of a pump) passes through the mesh assembly 140a, the ion resin 101, and the mesh assembly 140b and is then discharged through the outlet port 130 on the top of the housing 110 (connected to an input of the pump) and, while the coolant passes through the ion resin 101, ions are filtered and removed.

The removal of ions from the coolant makes it possible to prevent current leakage from the fuel cell stack, thereby suitably improving the electrical safety of the vehicle to meet the standard.

However, in the conventional demineralizer 100 shown in FIG. 3, the coolant flows through the longitudinal path between the inlet port 120 as the bottom port, and the outlet port 130 as the top port, and the region, in which the ion resin 101 is filled, along the longitudinal path corresponds to a region in which a difference in coolant pressure (differential pressure) occurs between the inlet side and the outlet side.

As a result, the coolant passing through the region in the longitudinal (axial) direction increases the differential pressure region in the demineralizer (the region in the longitudinal direction in which the ion resin is filled in FIG. 3, that is, the region between the top of the housing and the bottom of the housing), and thus a significant difference in pressure occurs between the coolant introduced through the inlet port and the coolant discharged through the outlet port.

Figure 5:
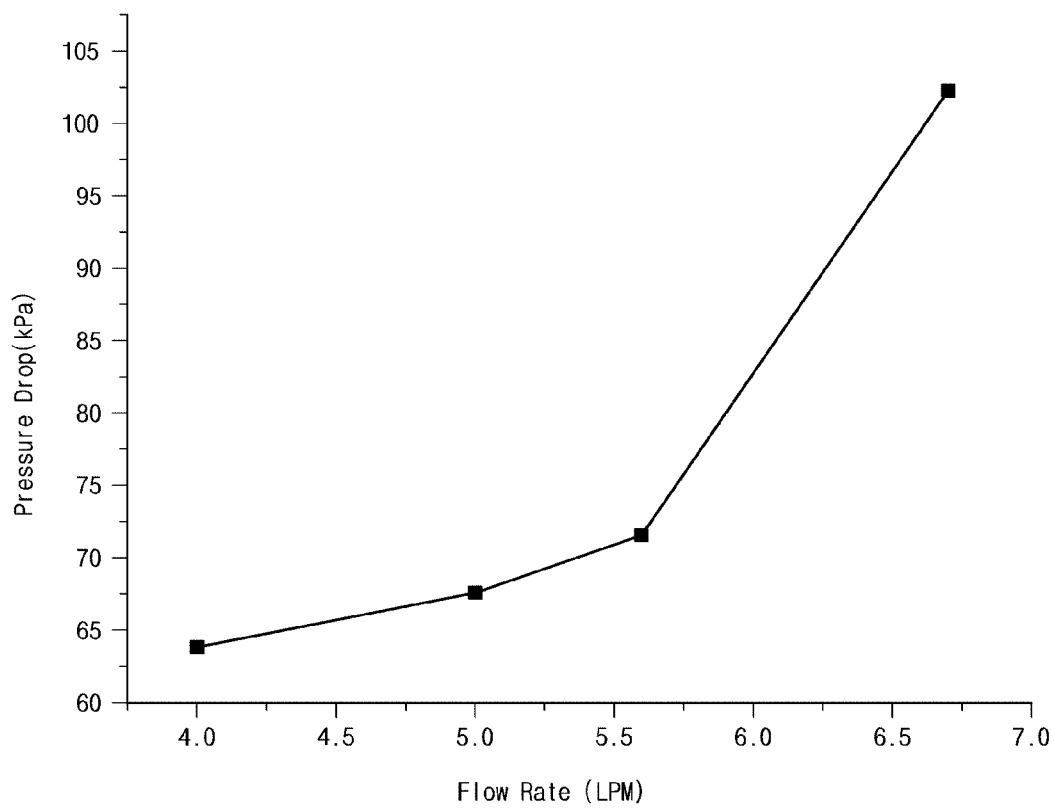
FIG. 5 is a graph showing an increase in differential pressure with respect to an increase in coolant flow rate in the conventional demineralizer.

FIG. 5 is a graph showing an increase in differential pressure with respect to an increase in coolant flow rate in the conventional demineralizer, from which it can be seen that a large differential pressure is formed when the flow rate of coolant is increased.

Moreover, as shown in FIG. 1, the conventional demineralizer is mounted in a bypass loop, not in a main coolant loop, and a high differential pressure is formed due to the long length of the differential pressure region in the ion resin layer. As a result, it is very difficult to effectively circulate the coolant.

In particular, the problem that the coolant does not smoothly flows significantly reduces the effect of filtering ions, and thereby the electrical conductivity is not significantly reduced during initial start-up of the vehicle. As a result, it is impossible to prevent the problem of current leakage.

Figure 6:
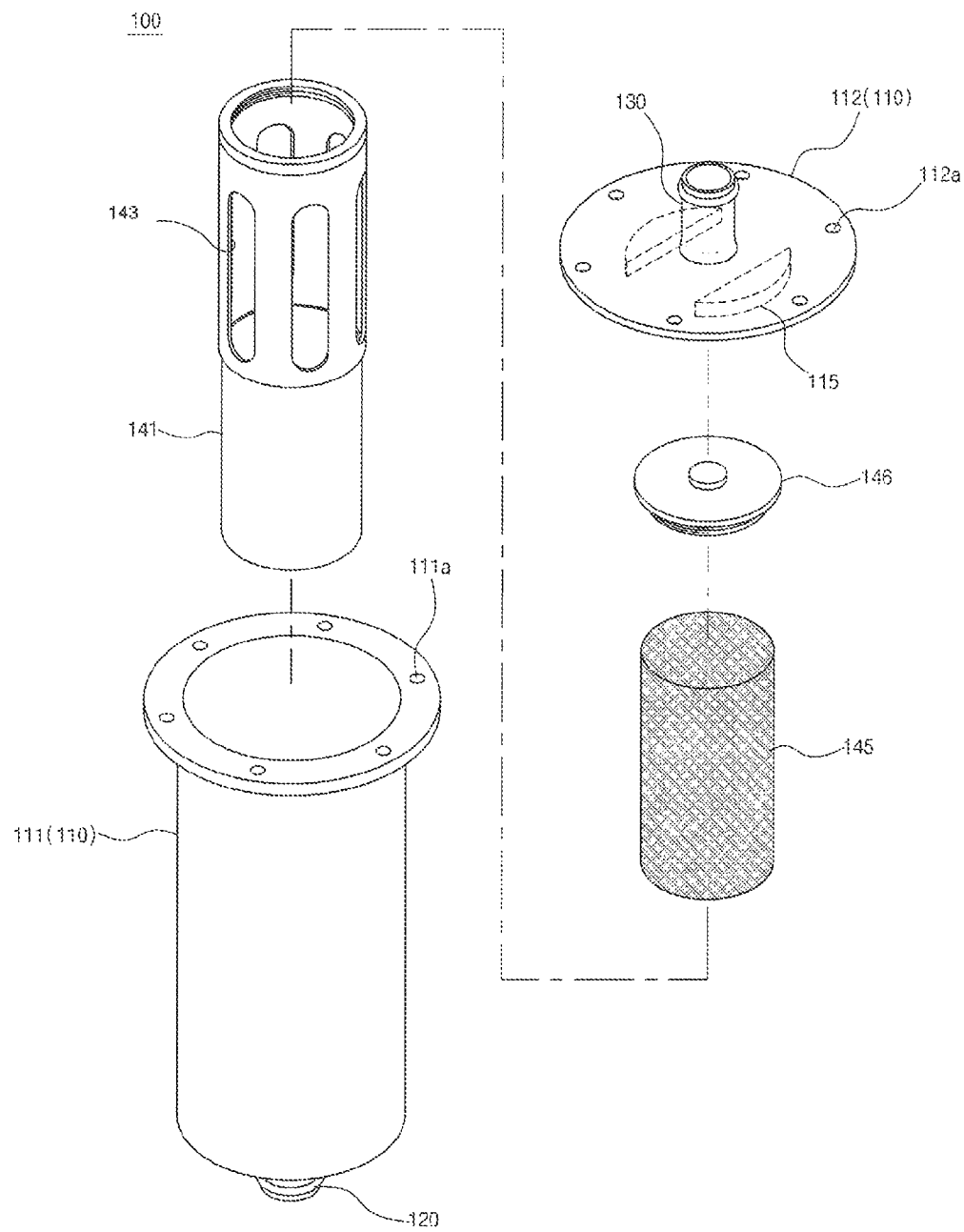
FIG. 6 is an exploded perspective view of a demineralizer in accordance with an exemplary embodiment of the present invention.
Figure 7:
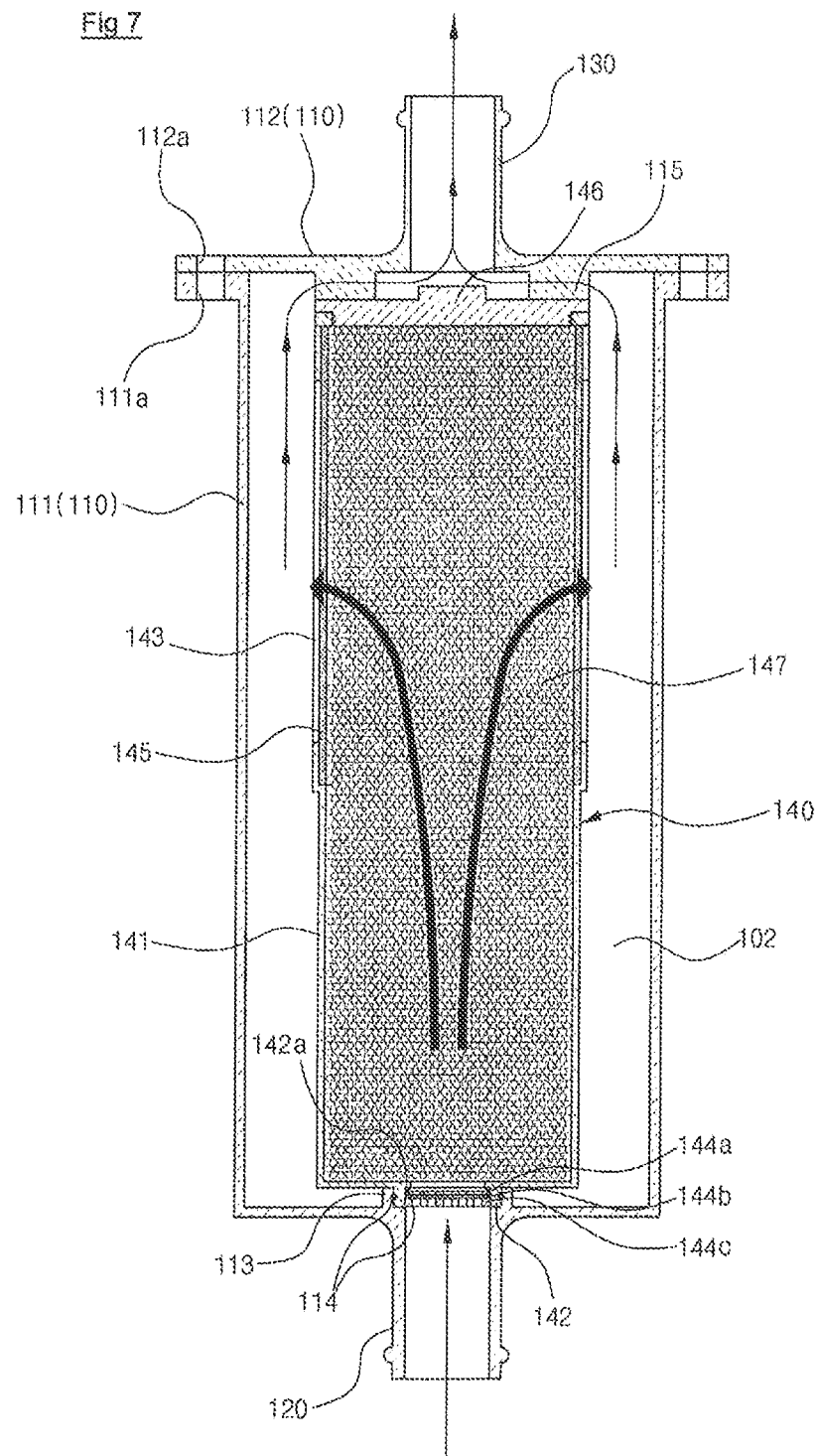
FIG. 7 is a longitudinal cross-sectional view of the demineralizer in accordance with an exemplary embodiment of the present invention.

FIG. 6 is an exploded perspective view of a demineralizer in accordance with an exemplary embodiment of the present invention, in which an ion resin is not shown, and FIG. 7 is a longitudinal cross-sectional view of the conventional coolant demineralizer.

Figure 8:
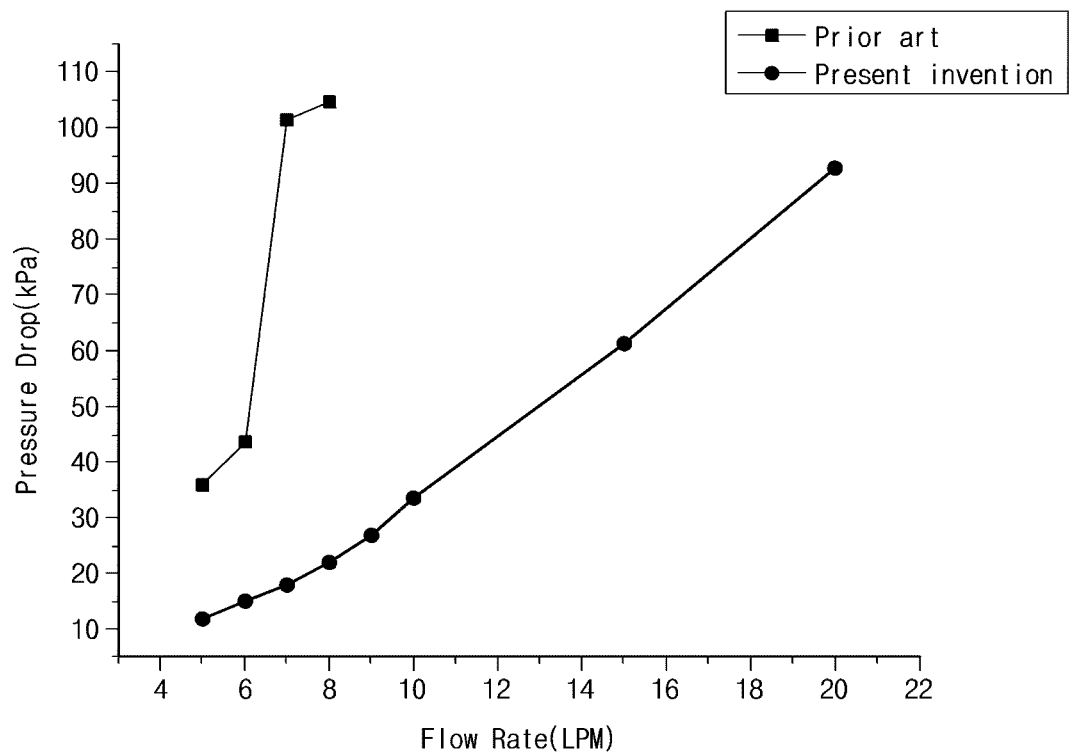
FIG. 8 is a graph showing a change in differential pressure of the demineralizer in accordance with the present invention and that of the conventional demineralizer.
Figure 9:
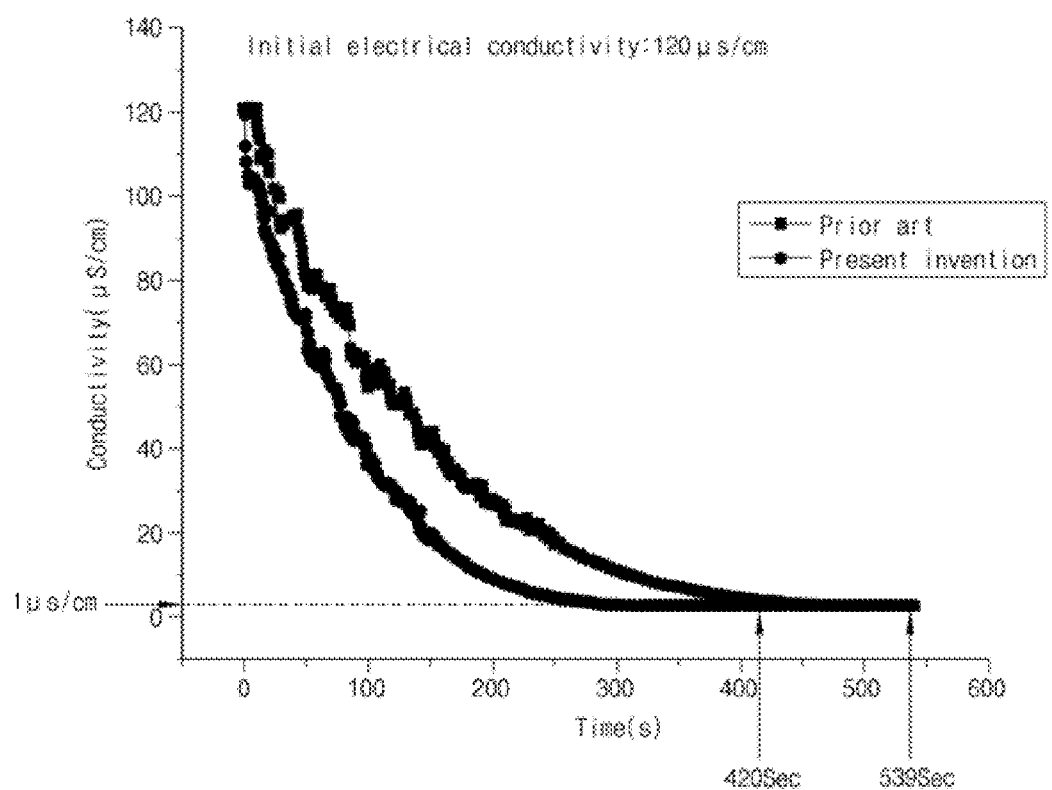
FIG. 9 is a graph showing a reduction in electrical conductivity in the demineralizer in accordance with the present invention and that of the conventional demineralizer.

FIG. 8 is a graph showing a change in differential pressure of the demineralizer in accordance with a further preferred embodiments of the present invention and that of the conventional demineralizer, and FIG. 9 is a graph showing a reduction in electrical conductivity in the demineralizer in accordance with the present invention and that of the conventional demineralizer.

According to preferred embodiments, the present invention provides a demineralizer for a fuel cell vehicle, which removes released ions from coolant of a fuel cell stack. In particular preferred embodiments, the present invention provides a demineralizer in which the configuration of a filter member, in which an ion resin is filled, is suitably modified such that the coolant is discharged through the filter member in a radial direction to prevent the occurrence of differential pressure, thereby reducing the length of the region (i.e., differential pressure region) of an ion resin layer through which the coolant passes.

In a first exemplary embodiment, the demineralizer 100 in accordance with the present invention comprises a housing 110 preferably including an inlet port 120 through which the coolant is suitably introduced and an outlet port 130 through which the coolant is suitably discharged and a filter member 140 for removing ions, in which an ion resin 147 is filled, mounted in the housing 110 and connected to the inlet port 120 of the housing 110.

Preferably, a flow chamber 102 suitably connected to the outlet port 130 of the housing 110 is provided on the outside of the filter member 140 in the housing 110. The flow chamber is formed by a space between the outer surface (outer circumferential surface) of the filter member 140 and the inner surface of the housing 110.

According to a further exemplary embodiment, in such a configuration, the coolant introduced through the inlet port 120 passes through the filter member 140 to be filtered by the ion resin 147 in the filter member 140, passes through the flow chamber 102, and is then finally discharged through the outlet port 130. Here, the coolant from which ions are removed passes through the flow chamber 102.

In a preferred embodiment, the housing 110 defines an inner space in which the filter member 140 is suitably placed and through which the filtered coolant passes. Preferably, the housing 110 may comprise a housing main body 111 and a housing cap 112. Preferably, the housing cap 112 may be detachably connected to the housing main body 111 to facilitate the replacement of the filter member 140.

For example, in certain exemplary embodiments, the housing cap 112 serves to seal or open the inner space of the housing main body 111 and may be suitably fixed to a flange formed on the top of the housing main body 111 by fastening means such as screws.

According to further exemplary embodiments, while the housing cap 112 is suitably separated from the housing main body 111 and opened, the filter member 140 is suitably inserted into the housing main body 111. Then, the housing cap 112 is closed and fixed to the housing main body 111 by fastening screws.

Reference numeral 111a denotes a screw fastening hole formed on the flange of the housing main body 111 and reference numeral 112a denotes a screw fastening hole formed on the housing cap 112 to correspond to the screw fastening hole 111a.

In further preferred embodiments, the inlet port 120, through which the coolant is introduced, is integrally formed at one end (the bottom in the figures) of the housing main body 111, and the outlet port 130 is integrally formed in the center of the housing cap 112 assembled with the other end (the top in the figures) of the housing main body 111.

Preferably, the inlet port 120 is suitably formed in the center of one end of the housing main body 111 and connected to the inner space of the filter member 140 inserted into the housing main body 111 such that the coolant introduced through the inlet port 120 is introduced into the inner space of the filter member 140 and then passes through the ion resin 147.

Further, the filter member 140 is suitably arranged in the center of the housing 110 in the longitudinal direction and along the same axis as the housing 110, and generally comprises a cylindrical filter frame 141 including an inlet 142 and an outlet 143, a mesh net 144b provided at the inlet 142 of the filter frame 141, a mesh net 145 provided at the outlet 143 of the filter frame 141, and the ion resin 147 filled in the inner space of the filter frame 141.

Preferably, a filter cap 146, which serves to suitably seal the inner space of the filter frame 141, may be detachably assembled with the other end of the filter frame 141, i.e., the opposite side of the inlet 142 to facilitate the replacement of the ion resin 147. Preferably, the filter cap 146 may be screw-connected to the filter frame 141 as illustrated above.

Further, the inlet 142 of the filter frame 141 projects from the center of one end of the filter frame 141 and is inserted and connected to a cylindrical connecting portion 113 projecting from the inside of the housing main body 111 and suitably connected to the inlet port 120.

Preferably, the mesh net 144b is suitably provided at the inlet 142 of the filter frame 141 to pass the coolant and prevent the ion resin 147 filled in the filter frame 141 from leaking.

In certain preferred embodiments, the mesh net 144b may be suitably supported by supports 144a and 144c provided in the inlet 142. Here, the supports 144a and 144c may be provided inside and outside the mesh net 144b, respectively, such that the mesh net 144b is disposed between the supports 144a and 144c and supported thereby.

Preferably, in certain exemplary embodiments, each of the supports 144a and 144b has a plurality of holes, through which the coolant passes. Preferably, the outer support 144c may be suitably fixed to the inside of the inlet 142 in an insertion manner or fastened to the inlet 142 by fastening means such as screws. Preferably, the inner support 144a may be suitably supported to a receiving end 142a projecting from the inner circumferential surface of the inlet 142 with an O-ring 114 interposed therebetween.

According to further preferred embodiments, when the inlet 142 of the filter frame 141 is suitably inserted into the connecting portion 113 of the housing main body 111, an O-ring 114 may be suitably interposed between the outer circumferential surface of the inlet of the filter frame 141 and the inner circumferential surface of the connecting portion 113 of the housing main body 111.

Accordingly, as a result, in further exemplary embodiments, the inlet 142 of the filter member 140 is suitably inserted and connected to the connecting portion 113 of the housing 110 such that the coolant introduced through the inlet port 120 of the housing 110 suitably passes through the mesh net 144b and the inside of the filter member 140, is filtered while passing through the ion resin 147 in the filter member 140, and is then discharged to the flow chamber 102 through the outlet 143 of the filter member 140.

According to other further preferred embodiments, the outlet 143 of the filter member 140 is formed in the longitudinal direction of the side surface of the filter frame 141, i.e., the outer circumferential surface of the filter frame 141, and a plurality of outlets 143 are provided in the circumferential direction of the filter frame 141 at regular intervals. Preferably, the plurality of outlets 143 are arranged side by side in the longitudinal direction of the filter member 140.

Moreover, according to other further exemplary embodiments, each outlet 143 is preferably provided in a predetermined area of the rear (the top in the figures) of the filter frame 141 in the longitudinal direction with respect to the direction that the coolant is introduced (from the bottom to the top) from the outer circumferential surface of the filter frame 141 (i.e., the side surface of the filter member) so as to provide sufficient filtering area in the ion resin layer, where the ions are removed from the coolant. For example, each outlet 143 may be suitably formed at the rear of the filter frame 141 with a length approximately half of the entire length of the filter frame 141.

Preferably, if the outlet 143 is formed in front of the filter frame 141 (the bottom in the figures) in the longitudinal direction, the coolant may not pass through the sufficient filtering area but may be suitably discharged to the flow chamber 102 without filtering.

According to other further preferred embodiments, the mesh net 145, which can pass the coolant but block the ion resin 147, is provided on the inner surface of the outlet 143 of the filter frame 141. Preferably, the mesh net 145 serves to suitably support the inner surface of the filter frame 141, more precisely, the ion resin 147 in the filter frame 141, and thus entrap the ion resin 147 inside the filter frame 141.

In further exemplary embodiments, the outlet 143 serves as a path for discharging the coolant, which has been suitably filtered while passing through the ion resin 147, to the flow chamber 102 formed around the filter member 140. Accordingly, when the outlet 143 is formed on the outer circumference of the filter frame 141, the advantages are as follows.

First, since the outlet 143 is suitably formed on the side surface of the filter member 140, i.e., the outer circumferential surface of the filter frame 141, the coolant introduced through the inlet port 120 of the housing 110 passes through the ion resin layer and is then discharged to the flow chamber 102 in a radial direction.

Accordingly, in further preferred embodiments, at this time, since the outlet 143 is suitably formed at the rear half of the filter member 140 (the top in the figures) in the longitudinal direction, the coolant passes through the ion resin layer having a shorter path from the inlet port 120 of the housing 110 to the outlet 143 of the filter member 140, compared to the conventional demineralizer configured such that the coolant passes through the entire region of the ion resin layer in the longitudinal direction from one end (inlet port) of the housing to the other end (outlet port) at the opposite side.

Accordingly, since the demineralizer 100 of the present invention is suitably configured such that the coolant is discharged from one end of the filter member 140 to the side surface of the filter member 140 in a radial direction, the path that the coolant passes through the ion resin layer is suitably shortened, which results in the prevention of pressure drop, i.e., differential pressure.

Further, in preferred embodiments, the flow chamber 102 should be suitably connected to the outlet port 130 such that the coolant is suitably discharged from the filter member 140 in a radial direction, passes through the flow chamber 102, and is then discharged through the outlet port 130 of the housing 110.

Therefore, a plurality of projections 115 for supporting the filter member 140 are formed on the inner surface of the housing cap 112, and the projections 115 are suitably spaced from each other such that the coolant passes therethrough.

Preferably, the projections 115 are in contact with the outer surface of the filter cap 146 (the top in the drawings) to support the filter member 140 and are spaced from each other to form a coolant path connected to the outlet port 130 such that the coolant in the flow chamber 102 passes through the coolant path between the projections 115 and is then suitably discharged through the outlet port 130.

In this way, in certain preferred embodiments, according to the demineralizer of the present invention, the coolant is suitably discharged from the filter member filled with the ion resin in a radial direction, and the length of the differential pressure region of the ion resin layer, through which the coolant passes, can be reduced to the extent that it does not affect the filtering performance. As a result, the differential pressure (i.e., the drop in coolant pressure) occurring in the demineralizer can be reduced and, thereby, the coolant can smoothly pass therethrough.

According to the demineralizer of the present invention, the length of the differential pressure region of the ion resin layer is significantly reduced, thereby considerably reducing the drop in coolant pressure, compared to the conventional demineralizer. As shown in FIG. 8, it can be seen that the occurrence of differential pressure can be significantly reduced particularly when pumping pressure of a coolant pump is low, that is, when the flow rate of coolant is low compared to the conventional demineralizer.

Further, according to exemplary embodiments of the present invention as described herein, it can be seen that since the occurrence of differential pressure is considerably reduced, the flow rate of the present invention is considerably increased with respect to the same differential pressure.

For example, as shown in FIG. 8, it has been confirmed that the pressure drop is improved by 78% (100 kPa@8LPM→22 kPa@8LPM) compared to the conventional demineralizer, and such a significant reduction in pressure drop increases the maximum flow rate of coolant, which passes through the demineralizer of the present invention, two and a half times.

Furthermore, when the differential pressure is considerably reduced by the radial discharge of coolant in the filter member according to the present invention, the coolant can smoothly flow through the demineralizer, which increases the filtering efficiency and rapidly reduces the electrical conductivity of the coolant. As a result, it is possible to solve the problem that the electrical conductivity is slowly reduced during initial start-up.

In particular preferred embodiments, since the rotational speed (e.g., 1,500 rpm) of the coolant pump is low during the initial start-up compared to that of the coolant pump during high-power operation (e.g., 3,500 rpm), the pumping pressure of the coolant pump is reduced in a low speed region during the initial start-up, and thereby the coolant cannot smoothly flow in the conventional demineralizer which has a high differential pressure. According to the demineralizer of the present invention, the coolant can more smoothly flow under the same operation conditions during the initial start-up due to the improvement of the differential pressure, and it is possible to suitably ensure the electrical safety of the driver during the initial start-up when the flow rate of the coolant is low.

According to certain preferred embodiments and as shown in FIG. 9, for example, FIG. 9 is a graph showing a reduction in electrical conductivity in the demineralizer in accordance with the present invention and that of the conventional demineralizer, in which the amount of time required for the initial electrical conductivity to be reduced from 120 μS/cm to less than 1 μS/cm under the same conditions (the same ion resin, the same pump pressure, and the same number of facilities) is shown.

It can be seen from FIG. 9 that the occurrence of differential pressure is suitably reduced and the reduction in the electrical conductivity is suitably improved in the demineralizer of the present invention and that the amount of time required to reach the electrical conductivity of less than 1 μS/cm during the initial start-up is significantly reduced compared to the conventional demineralizer.

For example, when a vehicle is parked for a certain period of time such as weekends, ions are released from all components that constitute the coolant loop, and thereby the electrical conductivity of coolant is increased (e.g., from 0.5~2 μS/cm to 5~8 μS/cm). As shown in FIG. 9, the time required for the electrical conductivity to reach a normal value (less than 2 μS/cm) during the initial start-up was reduced about 22% (from 539 sec. to 420 sec.).

As described above, according to the coolant demineralizer of the present invention, the coolant is discharged from the filter member, in which the ion resin is filled, in a radial direction to reduce the occurrence of differential pressure. As a result, it is possible to suitably reduce the length of region of the ion resin layer (i.e., differential pressure region), through which the coolant passes, such that coolant smoothly flows through the demineralizer, thereby suitably increasing the effect of filtering ions and, at the same time, solving the problems of the generation of electrical conductivity, the current leakage from a fuel cell stack, and the electrical safety.

In particular, as described in preferred embodiments of the present invention, it is possible to considerably reduce the occurrence of differential pressure when the pumping pressure of the coolant pump is low during initial start-up, i.e., when the flow rate of coolant is low, compared to the conventional demineralizer.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A coolant demineralizer for a fuel cell vehicle, the coolant demineralizer comprising:
    a housing including an inlet port formed in a center of one end of a housing main body and an outlet port formed in a center of a housing cap assembled at an opposite end of the housing main body; and
    a filter member, in which an ion resin is filled, including an inlet formed at one end of the filter member and directly connected to the inlet port such that coolant is introduced therethrough directly into the filter member and an outlet formed on a side of the filter member such that the coolant passing through the ion resin is discharged from the side in a radial direction,
    wherein the coolant demineralizer further comprises a flow chamber connected to the outlet port of the housing and formed around the periphery of the filter member in the housing such that the coolant is discharged from the filter member through the outlet in a radial direction toward the flow chamber, then passes through the flow chamber and then discharged from the flow chamber to the outlet port, and
    wherein the inlet includes a planar mesh screen disposed horizontally below a lower end of a vertically oriented tubular side wall of the filter member, the planar mesh screen having an inner surface that contacts the ion resin, and the tubular sidewall having a lower half that is imperforate and an upper half that includes the outlet having a plurality of outlet openings that are covered by a mesh net with an inner surface contacted by the ion resin.

2. The coolant demineralizer of claim 1, wherein the filter member is inserted into the housing in the longitudinal direction and along the same axis as the housing and the flow chamber is formed by a space between the outer surface of the filter member, on which the outlet is formed, and the inner surface of the housing.

3. The coolant demineralizer of claim 1, further comprising a filter cap detachably assembled with the other end of the filter frame to open and close the inner space of the filter frame.

4. The coolant demineralizer of claim 1, wherein the housing comprises a housing main body including the inlet port and accommodating the filter member and a housing cap including the outlet port and sealing the housing main body, wherein the housing cap is detachably assembled with the housing main body.

5. The coolant demineralizer of claim 4, wherein the housing cap comprises a plurality of projections formed on an inner surface of the housing cap and supporting the filter member such that a coolant path for connecting the flow chamber and the outlet port is formed between the projections.

6. A coolant demineralizer for a fuel cell vehicle, the coolant demineralizer comprising:
a housing comprising an inlet port and an outlet port;
a filter member, in which an ion resin is filled, the filter member comprising, (i) an inlet connected to the inlet port such that coolant is introduced therethrough directly into the filter member and (ii) an outlet such that the coolant passing through the ion resin is discharged therethrough; and
a flow chamber through which the fluid flows after being discharged from the filter member, and
wherein the inlet includes a planar mesh screen disposed horizontally below a lower end of a vertically oriented tubular side wall of the filter member, the planar mesh screen having an inner surface that contacts the ion resin, and the tubular sidewall having a lower half that is imperforate and an upper half that includes the outlet having a plurality of outlet openings that are covered by a mesh net with an inner surface contacted by the ion resin.

7. The coolant demineralizer for a fuel cell vehicle of claim 6, wherein the flow chamber is connected to the outlet port of the housing and is formed around the periphery of the filter member in the housing such that the coolant is discharged from the filter member through the outlet in a radial direction and then discharged from the flow chamber to the outlet port.

* * * * *